United States Patent
Shamoto

(10) Patent No.: US 7,766,788 B2
(45) Date of Patent: Aug. 3, 2010

(54) DRIVE FORCE OUTPUT APPARATUS, METHOD FOR CONTROLLING SAME APPARATUS, AND VEHICLE

(75) Inventor: Sumikazu Shamoto, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 106 days.

(21) Appl. No.: 12/263,622

(22) Filed: Nov. 3, 2008

(65) Prior Publication Data
US 2009/0131215 A1 May 21, 2009

(30) Foreign Application Priority Data
Nov. 21, 2007 (JP) ............... 2007-301290

(51) Int. Cl.
*B60K 1/02* (2006.01)
(52) U.S. Cl. ............................. 477/3; 477/7
(58) Field of Classification Search ............ 477/3, 477/7, 15, 20
See application file for complete search history.

(56) References Cited

U.S. PATENT DOCUMENTS 6,026,921 A * 2/2000 Aoyama et al. ......... 180/65.25
7,377,876 B2 * 5/2008 Yang ........................... 477/3
7,698,042 B2 * 4/2010 Shimizu et al. ............. 701/51

FOREIGN PATENT DOCUMENTS

| JP | 2003-047108 A | 2/2003 |
| JP | 2004-166367 A | 6/2004 |
| JP | 2005-039880 A | 2/2005 |
| JP | 2005-210841 A | 8/2005 |
| JP | 2005-212595 A | 8/2005 |

* cited by examiner

*Primary Examiner*—Ha D. Ho
(74) *Attorney, Agent, or Firm*—Kenyon & Kenyon LLP

(57) ABSTRACT

A drive force output apparatus has a controller that sets an upper limit of power allowed to be consumed by an auxiliary based on at least a reference power storage amount corresponding to the reference of the range in which the power storage amount of a power storage is monitored and controls a power generator, an electric motor, and the auxiliary such that drive force corresponding to target drive force is output to a drive shaft while the power consumed by the auxiliary remains equal to or smaller than the upper limit.

10 Claims, 9 Drawing Sheets

DRIVE FORCE OUTPUT APPARATUS, METHOD FOR CONTROLLING SAME APPARATUS, AND VEHICLE

INCORPORATION BY REFERENCE

The disclosure of Japanese Patent Application No. 2007-301290 filed on Nov. 21, 2007 including the specification, drawings and abstract is incorporated herein by reference in its entirety.

BACKGROUND OF THE INVENTION

1. Field of the Invention

The invention relates to a drive force output apparatus, a method for controlling a drive force output apparatus, and a vehicle.

2. Description of the Related Art

Japanese Patent Application Publication No. 2003-47108 (JP-A-2003-47108) describes a drive force output apparatus having a drive motor, a power generator that generates power using the drive force of an engine, an inverter that drives the drive motor and the power generator, and a nickel metal hydrogen battery that exchanges power with the inverter, and the drive force output apparatus. This drive force output apparatus controls the engine, the power generator, and the drive motor so as to output a target torque set based on the operation by the driver while ensuring that the SOC (State Of Charge) level of the battery changes within a predetermined control range referenced at a target SOC level that is set within a proper SOC range. According to this drive force output apparatus, when a memory effect of the battery is detected, the target SOC level is changed so as to eliminate the memory effect.

A drive force output apparatus of this kind is also described in Japanese Patent Application Publication No. 2005-212595 (JP-A-2005-212595) which has an engine, a first motor, a drive force distribution mechanism connected to the engine and to the first motor, a second motor, and a transmission that transmits drive force from the second motor to a drive shaft while changing the speed ratio, a battery that exchanges power with the first and second motors, and an auxiliary electrically connected to the battery. According to this drive force output apparatus, if the power consumption of the auxiliary exceeds the output limit of the battery during the shifting of the transmission, the operation of the auxiliary is limited so as to avoid excessive discharge of the battery.

In general, drive force output apparatuses of this kind involve a difficulty in properly monitoring and controlling the SOC level of the battery. Thus, the target SOC level needs to be properly changed even if any memory effect has not been detected.

With regard to drive force output apparatuses of this kind, further, when it is required for the second motor to output relatively large torque, it is necessary to secure a sufficient amount of power for satisfying the torque output requirement. In this case, one option is to limit the power used for the auxiliary. However, how to limit the power for the auxiliary in such a case is still a pending issue.

SUMMARY OF THE INVENTION

The invention relates to a drive force output apparatus, a method for controlling the same apparatus, and a vehicle, which more properly monitor and control the amount of power stored in a power storage and thus more reliably secure power for driving an electric motor.

The first aspect of the invention relates to a drive force output apparatus for outputting drive force to a drive shaft, having a power generator that generates power using fuel supplied to the power generator; an electric motor that outputs drive force to the drive shaft; a power storage that exchanges power with the power generator and with the electric motor; an auxiliary that operates on power supplied from a power supply system including the power storage; a target drive force setting portion that sets a target drive force required at the drive shaft; and a controller that; sets a reference power storage amount corresponding to the reference of a range within which the amount of power stored in the power storage is monitored based on at least one of the state of operation by an operator and the state of the drive force output apparatus; sets an maximum auxiliary power representing the upper limit of power allowed to be consumed by the auxiliary based on at least the reference power storage amount and monitors the power storage amount of the power storage based on the reference power storage amount; and controls the power generator, the electric motor, and the auxiliary such that drive force corresponding to the target drive force set by the target drive force setting portion is output to the drive shaft while the power consumed by the auxiliary remains equal to or smaller than the maximum auxiliary power.

According to the drive force output apparatus of the first aspect of the invention, as described above, the reference power storage amount corresponding to the reference of the range within which the power storage amount of the power storage is monitored is set based on at least one of the state of operation by the operator and the state of the drive force output apparatus, and the maximum auxiliary power representing the upper limit of power allowed to be consumed by the auxiliary is set based on the set reference power storage amount, and the power storage amount of the power storage is monitored based on the reference power storage amount, and the power generator, the electric motor, and the auxiliary are controlled such that drive force corresponding to the target drive force is output to the drive shaft while the power consumed by the auxiliary remains equal to or smaller than the maximum auxiliary power. As such, because the power storage amount of the power storage is monitored based on the reference power storage amount that is set based on the state of operation by the operator and/or the state of the drive force output apparatus, the power storage amount of the power storage can be monitored and controlled more properly. Further, because the power consumed by the auxiliary is kept equal to or smaller than the maximum auxiliary power, the power consumed by the auxiliary is limited based on the state of operation by the operator and/or the state of the drive force output apparatus, and power for driving the electric motor can be more reliably secured. Certainly, drive force corresponding the target drive force can be properly output to the drive shaft.

The second aspect of the invention relates to a vehicle incorporating a drive force output apparatus according to the first aspect of the invention, wherein a vehicle axle is connected to the drive shaft.

Incorporating the drive force output apparatus of the first aspect of the invention, the vehicle of the second aspect of the invention provides the same advantages and effects as those of the drive force output apparatus of the first aspect of the invention, such as the aforementioned capability of monitoring and controlling the power storage amount of the power storage more properly and the aforementioned capability of securing power for driving the electric motor more reliably.

The third aspect of the invention provides a method for controlling a drive force output apparatus having: a power generator that generates power using fuel supplied to the power generator; an electric motor that outputs drive force to a drive shaft; a power storage that exchanges power with the power generator and with the electric motor; and an auxiliary that operates on power supplied from a power supply system including the power storage. This method includes: setting a reference power storage amount corresponding to the reference of a range in which the power storage amount of the power storage is monitored based on at least one of the state of operation by an operator and the state of the drive force output apparatus; setting an maximum auxiliary power representing the upper limit of power allowed to be consumed by the auxiliary based on at least the reference power storage amount; and monitoring the power storage amount of the power storage based on the reference power storage amount and controlling the power generator, the electric motor, and the auxiliary such that drive force corresponding to the target drive force required at the drive shaft is output to the drive shaft while the power consumed by the auxiliary remains equal to or smaller than the maximum auxiliary power.

According to the control method of the third aspect of the invention, as described above, the reference power storage amount corresponding to the reference of the range within which the power storage amount of the power storage is monitored is set based on at least one of the state of operation by the operator and the state of the drive force output apparatus, and the maximum auxiliary power representing the upper limit of power allowed to be consumed by the auxiliary is set based on the set reference power storage amount, and the power storage amount of the power storage is monitored based on the reference power storage amount, and the power generator, the electric motor, and the auxiliary are controlled such that drive force corresponding to the target drive force is output to the drive shaft while the power consumed by the auxiliary remains equal to or smaller than the maximum auxiliary power. As such, because the power storage amount of the power storage is monitored based on the reference power storage amount that is set based on the state of operation by the operator and/or the state of the drive force output apparatus, the power storage amount of the power storage can be monitored and controlled more properly. Further, because the power consumed by the auxiliary is kept equal to or smaller than the maximum auxiliary power, the power consumed by the auxiliary is limited based on the state of operation by the operator and/or the state of the drive force output apparatus, and power for driving the electric motor can be more reliably secured. Certainly, drive force corresponding the target drive force can be properly output to the drive shaft.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE EMBODIMENTS

Figure 1:
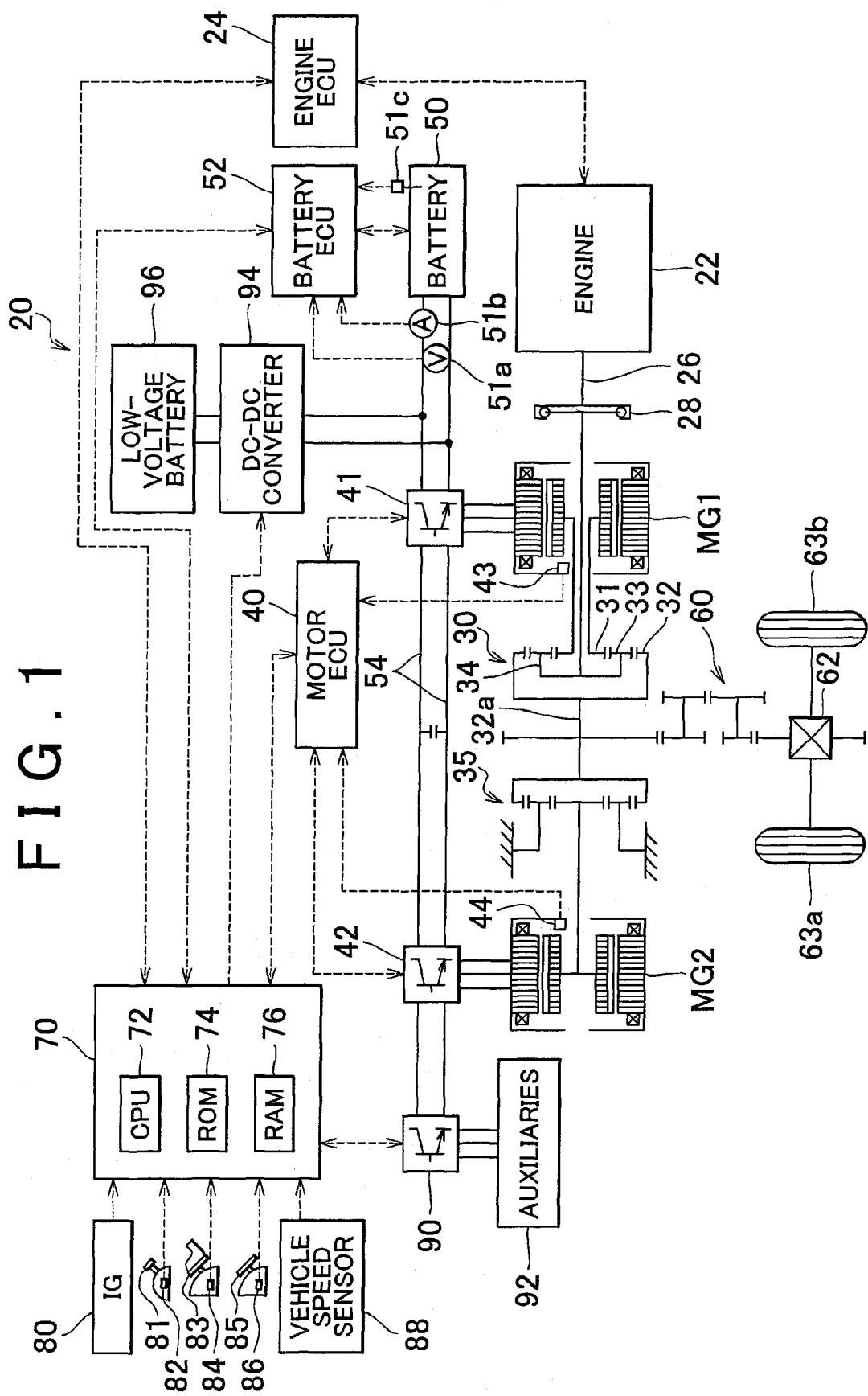
FIG. 1 is a view schematically showing the configuration of a hybrid vehicle incorporating a drive force output apparatus according to an example embodiment of the invention.

FIG. 1 is a view schematically showing the configuration of a hybrid vehicle 20 incorporating a drive force output apparatus according to an example embodiment of the invention. Referring to FIG. 1, the hybrid vehicle 20 has an engine 22, a three-shaft type drive force distribution-combination mechanism 30 connected to a crankshaft 26, which is the output shaft of the engine 22, via a damper 28, an electric motor MG1 connected to the drive force distribution-combination mechanism 30 and capable of generating power, a reduction gear unit 30 coupled with a ring gear shaft 32a that is a drive shaft in this example embodiment and connected to the drive force distribution-combination mechanism 30, a motor MG2 connected to the reduction gear unit 35, and a hybrid electronic control unit (will be referred to as "hybrid ECU") 70 that governs the overall control of the entire drive force output apparatus.

The engine 22 is an internal combustion engine that runs on hydrocarbon fuel (e.g., gasoline, light oil) to produce drive force under various operation controls executed by an engine electronic control unit (will be referred to as "engine ECU") 24, such as fuel-injection control, ignition control, intake amount adjustment control, and so on. The engine ECU 24 receives signals from various sensors for detecting the operation state of the engine 22, such as signals from a crank position sensor, not shown in the drawings, that detects the rotational angle of the crankshaft 26 of the engine 22. The engine ECU 24 communicates with the hybrid ECU 70 and controls the operation of the engine 22 based on the control signals from the hybrid ECU 70 and provides, as needed, the hybrid ECU 70 with various data regarding the operation state of the engine 22. The engine ECU 24 calculates the rotation speed of the crankshaft 26, which indicates an engine speed Ne of the engine 22, based on the rotational position of the crankshaft 26 indicated by the signals output from the crank position sensor.

The drive force distribution-combination mechanism 30 is a planetary gear mechanism constituted of a sun gear 31 that is an external gear, a ring gear 32 that is an internal gear and is coaxial with the sun gear 31, pinions 33 in mesh with the sun gear 31 and the ring gear 32, and a carrier 34 on which the pinions 33 are supported so as to rotate while moving around the sun gear 31. Thus structured, the drive force distribution-combination mechanism 30 provides differential functions using the sun gear 31, the ring gear 32, and the carrier 34 as rotational elements. The crankshaft 26 of the engine 22 is connected to the carrier 34, the electric motor MG1 is connected to the sun gear 31, the reduction gear unit 35 is connected to the ring gear 32 via the ring gear shaft 32a. When the electric motor MG1 operates as a generator, the drive force input from the engine 22 to the carrier 34 is distributed to the sun gear and to the ring gear 32 according to the gear ratio between the sun gear 31 and the ring gear 32. On the other hand, when the electric motor MG1 operates as a motor, the drive force input from the engine 22 to the carrier 34 and the drive force input from the electric motor MG1 to the sun gear 31 are combined and then output to the ring gear 32. The drive force output to the ring gear 32 is finally transferred to drive wheels 63a, 63b of the vehicle via the ring gear shaft 32a, a gear mechanism 60, and a differential gear unit 62.

The electric motors MG1, MG2 are both a synchronous motor-generator operable as both a motor and a generator. The electric motors MG1, MG2 exchange power with a battery 50 via inverters 41, 42. An power line 54 is provided between the inverter 41 and the inverter 42, which is constituted of a positive bus and a negative bus shared by the inverters 41, 42, so that the power generated by one of the electric motors MG1, MG2 can be consumed by the other. Thus, the battery 50 is charged with the power generated by the electric motor MG1 and/or by the electric motor MG2 and discharges power to compensate for the shortage of power at the electric motor MG1 and/or at the electric motor MG2. Note that when the power balance between the electric motor MG1 and the electric motor MG2 is even, neither of the power charge nor the power discharge of the battery 50 is performed. The electric motors MG1, MG2 are both controlled by a motor electronic control unit (will hereinafter be referred to as "motor ECU") 40. The motor ECU 40 receives various signals used for the drive control of the electric motors MG1, MG2 such as the signals output from a rotational position sensor 43 for detecting the rotational position of the rotor of the electric motor MG1 and a rotational position sensor 44 for detecting the rotational position of the rotor of the electric motor MG2 and the signals output from current sensors (not shown in the drawings) that detect the phase current supplied to the electric motors MG1, MG2. The motor ECU 40 outputs switching signals to the inverters 41, 42. The motor ECU 40 communicates with the hybrid vehicle ECU 70 and controls the electric motors MG1, MG2 according to the control signals output from the hybrid vehicle ECU 70 and provides, when necessary, the hybrid vehicle ECU 70 with various data regarding the operation states of the electric motors MG1, MG2. The motor ECU 40 calculates a rotation speed Nm1 of the electric motor MG1 and a rotation speed Nm2 of the electric motor MG2 based on the signals output from the rotation position sensors 43, 44.

The battery 50 is controlled by a battery electronic control unit (will hereinafter be referred to as "battery ECU") 52. The battery ECU 52 receives various signals necessary for controlling the battery 50, such as the signals output from a voltage sensor 51a that is provided between the terminals of the battery 50 to detect a voltage Vb between the terminals, the signals output from a current sensor 51b that is provided on the power line 54 connected to the output terminal of the battery 50 to detect a charge-discharge current Ib, and the signals output from a temperature sensor 51c that is attached on the battery 50 to detect a temperature Tb of the battery 50. The battery ECU 52 provides, when necessary, the hybrid vehicle ECU 70 with various data regarding the state of the battery 50. The battery ECU 52 calculates the SOC (State Of Charge) of the battery 50 by accumulating the value of current detected by the current sensor 51b. Further, the battery ECU 52 calculates, from the calculated SOC and the battery temperature Tb, a battery-input limit value Win representing the maximum power chargeable to the battery 50 and a battery-output limit value Wout representing the maximum power dischargeable from the battery 50. At this time, more specifically, standard values of the battery-input limit value Win and the battery-output limit value Wout are calculated based on the battery temperature Tb, and a battery-output limit correction coefficient and a battery-input limit correction coefficient are set based on the SOC level of the battery 50. Then, the standard value of the battery-input limit value Win is multiplied by the battery-input limit correction coefficient, whereby the battery-input limit value Win is calculated, and the standard value of the battery-output limit value Wout is multiplied by the battery-output limit correction coefficient, whereby the battery-output limit value Wout is calculated.

High-voltage auxiliaries 92 including an air compressor of an air-conditioning system for a passenger compartment and a coolant pump for circulating coolant of a cooling system for cooling the electric motors MG1, MG2 are connected to the power line 54 via a drive circuit 90. Also connected to the power line 54 is a DC-DC converter 94 that converts the power at the power line 54 into lower voltage power and then supplies it to a low-voltage battery 96.

Meanwhile, referring to FIG. 1, the hybrid vehicle ECU 70 is constituted of a microprocessor including a CPU (Central Processing Unit) 72 as the main component, a ROM (Read Only Memory) 74 storing various operation and control programs, a RAM (Random Access Memory) 76 for temporarily storing various data, an input port (not shown in the drawings), an output port (not shown in the drawings), and a communication port (not shown in the drawings). The hybrid vehicle ECU 70 receives, via the input port, various signals including: ignition signals output from an ignition switch 80; the signals output from a shift position sensor 82 for detecting the shift position SP of a shift lever 81, the signals from an accelerator-pedal position sensor 84 for detecting accelerator operation amount Acc according to the travel of an accelerator pedal 83; the signals output from a brake-pedal position sensor 86 for detecting a brake pedal position BP according to the travel of the brake pedal 85; and the signals output from the vehicle speed sensor 88 for detecting the vehicle speed V. The hybrid ECU 70 outputs, via the output port, various signals such as the drive signals for the drive circuit 90 for driving the auxiliaries 92 and the drive signals for the DC-DC converter 94. As mentioned earlier, the hybrid ECU 70 is connected via the communication port to the engine ECU 24, the motor ECU 40, and the battery ECU 52 and exchanges various control signals and various data with them.

Having the above-described configuration, the hybrid vehicle 20 of this example embodiment calculates the torque required to be output to the ring gear shaft 32a, which is the drive shaft, based on the accelerator operation amount Acc corresponding to the travel of the accelerator pedal 83 depressed by the driver and the vehicle speed V and then controls the engine 22 and the electric motors MG1, MG2 so as to output a drive force corresponding to the required torque to the ring gear shaft 32a. The engine 22 and the electric motors MG1, MG2 are operated in the following operation modes. The first mode is a torque conversion operation mode in which the engine 22 is controlled so as to output drive force corresponding to the required drive force while controlling the electric motors MG1, MG2 such that the drive force output from the engine 22 is entirely converted into torque via the drive force distribution-combination mechanism 30 and the electric motors MG1, MG2 and then output to the ring gear shaft 32a. The second operation mode is a charge-discharge operation mode in which the engine 22 is controlled so as to output drive force corresponding to the sum of the required drive force and the drive force necessary for charging or discharging of the battery 50 while controlling the electric motors MG1, MG2 such that the drive force output from the engine 22 is entirely, or partially, converted into torque via the drive force distribution-combination mechanism 30 and the electric motors MG1, MG2 and then output to the ring gear shaft 32a. The third mode is a motor drive mode in which the engine 22 is stopped and the electric motor MG2 is controlled so as to output drive force corresponding to the required drive force to the ring gear shaft 32a. In the torque conversion operation mode and the charge-discharge operation mode, the engine 22 and the electric motors MG1, MG2 are controlled so as to output the required drive force to the ring gear shaft 32a using the engine 22, and thus the control procedures for these two operation modes are substantially the same as each other. For this reason, in the following description, the torque conversion operation mode and the charge-discharge operation mode will be collectively referred to as "engine drive mode" where necessary.

Figure 2:
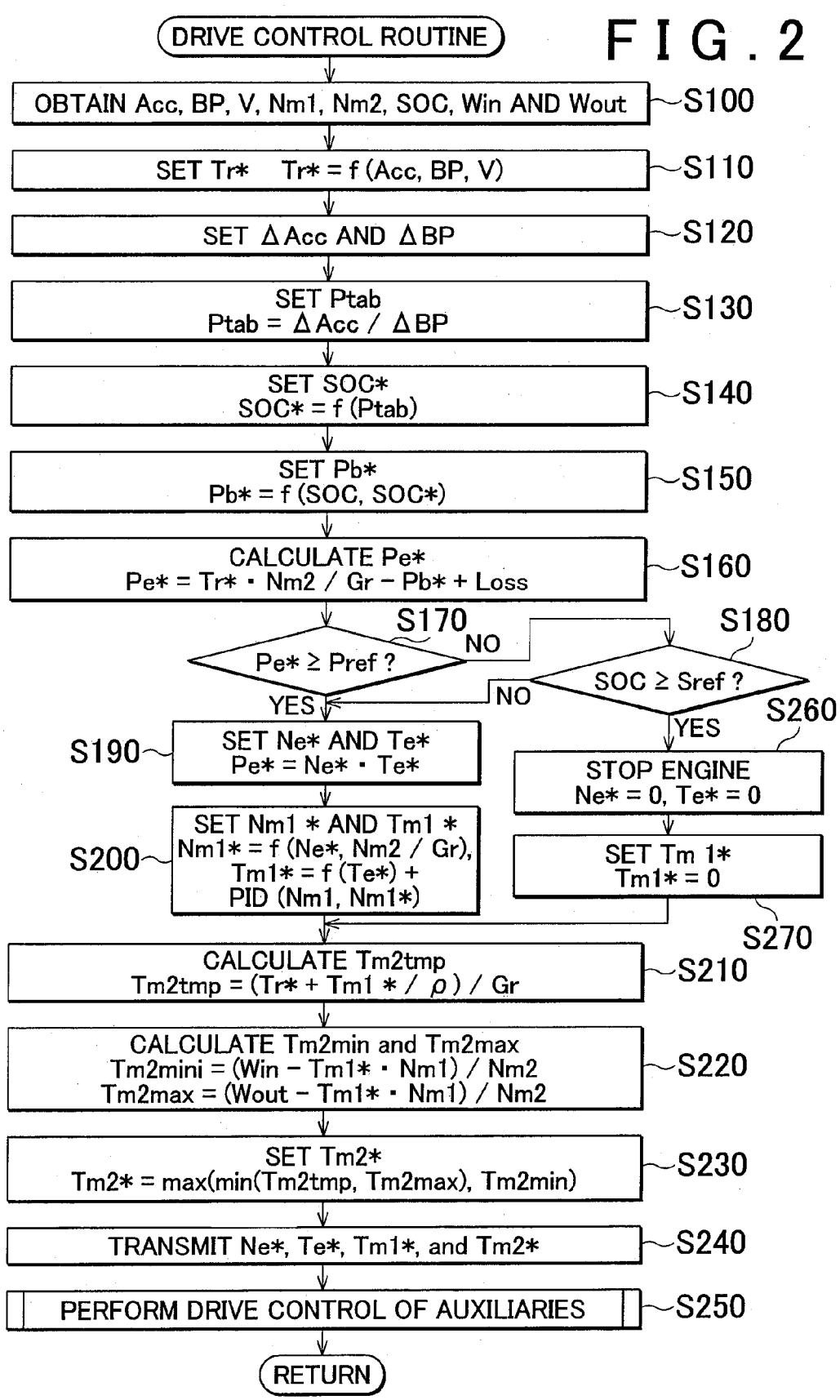
FIG. 2 is a flowchart illustrating one example of a drive control routine executed by a hybrid ECU of the drive force output apparatus of the example embodiment of the invention.

Next, the operation of the hybrid vehicle 20 configured as described above will be described. The flowchart of FIG. 2 illustrates an example of a drive control routine executed by the hybrid ECU 70. This routine is repeatedly executed at given time intervals (e.g., several milliseconds).

After the start of the drive control routine, the CPU 72 of the hybrid ECU 70 first executes processes for obtaining various data for control, including the accelerator operation amount Acc detected by the accelerator-pedal position sensor 84, the brake-pedal position BP detected by the brake-pedal position sensor 86, the vehicle speed V detected by the vehicle speed sensor 88, the rotation speeds Nm1, Nm2 of the electric motors MG1, MG2, the SOC level of the battery 50, and the battery-input limit value Win and the battery-output limit value Wout of the battery 50 (step S100). More specifically, the rotation speed Nm1 of the electric motor MG1 and the rotation speed Nm2 of the electric motor MG2 are calculated by the motor ECU 40 based on the rotational positions of the rotors of the electric motors MG1, MG2 and then output to the CPU 72 by communication. The SOC level of the battery 50 is calculated by the battery ECU 52 based on an accumulated value of the charge-discharge current Ib detected by the current sensor 51b and then output to the CPU 72 by communication. The battery-input limit value Win and the battery-output limit value Wout of the battery 50 are set by the battery ECU 52 based on the battery temperature Tb of the battery 50 and the SOC level of the battery 50 and then output to the CPU 72 by communication.

Figure 3:
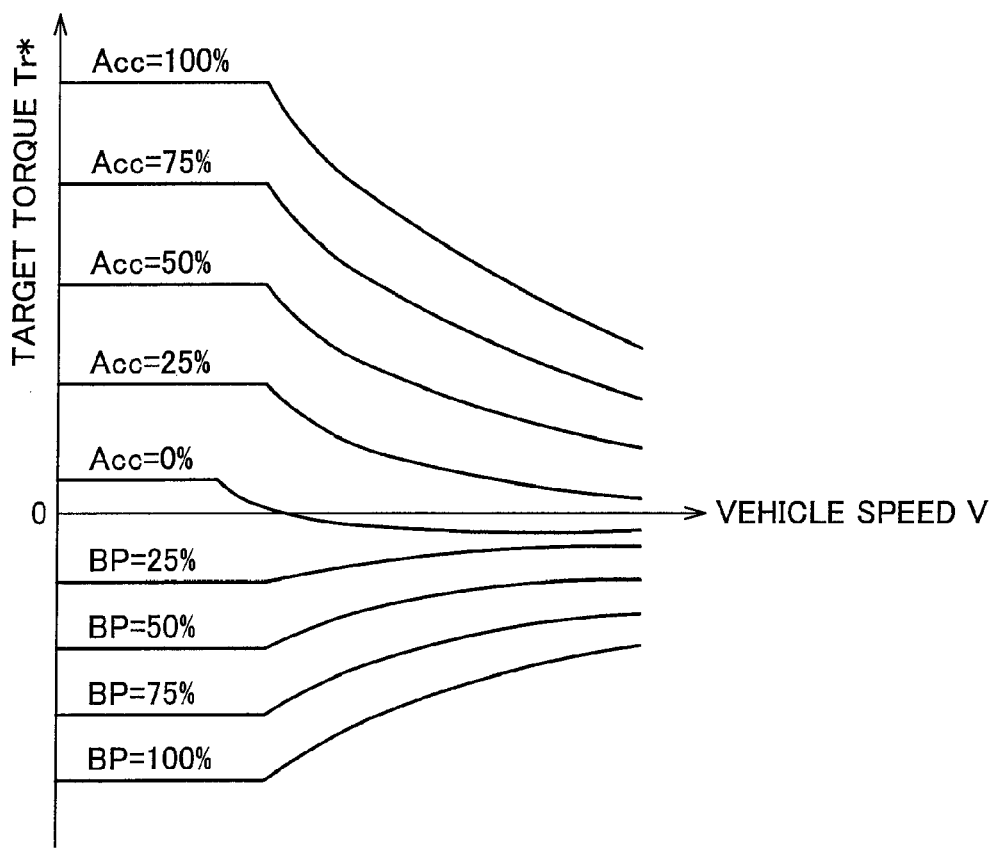
FIG. 3 is a chart illustrating an example of a target toque-setting map.

Then, based on the accelerator operation amount Acc, the brake-pedal position BP, and the vehicle speed V obtained as mentioned above, the CPU 72 sets a target torque Tr* that is required to be output to the ring gear shaft 32a (drive shaft) connected to the drive wheels 63a, 63b (step S110). In this example embodiment, a map defining a relation among the accelerator operation amount Acc, the brake-pedal position BP, the vehicle speed V, and the target torque Tr* is prepared in advance and stored in the ROM 74, and the target torque Tr* is set by applying the accelerator operation amount Acc, the brake-pedal position BP, and the vehicle speed V to the map, which will be referred to as "target torque-setting map". FIG. 3 shows an example of the target toque-setting map.

Figure 4:
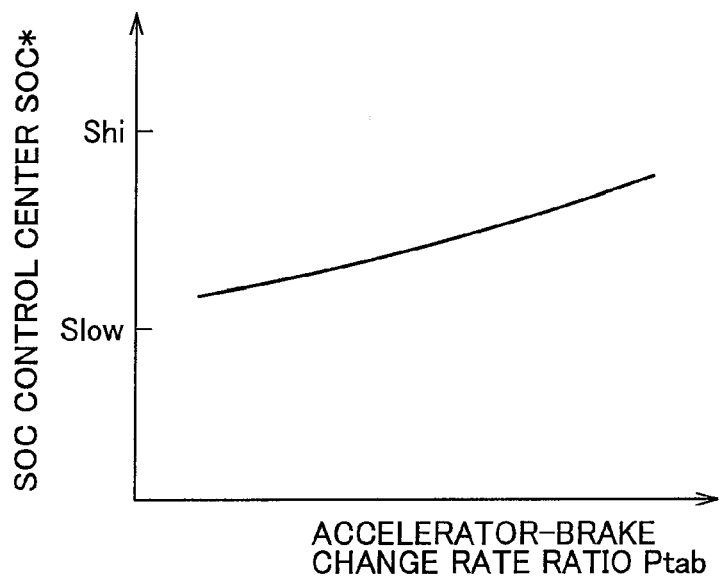
FIG. 4 is a chart illustrating an example of a map defining the relation between an accelerator-brake operation amount change rate ratio and the SOC monitoring reference level SOC*.

Next, the CPU 72 sets an SOC monitoring reference level SOC* representing the reference of the SOC monitoring range in which the SOC level of the battery 50 is monitored based on a predetermined accelerator operation amount Acc as a driver's operation and/or a brake-pedal position BP (step S120 to step S140). More specifically, in this example embodiment of the invention, the SOC monitoring reference level SOCK is set as follows. First, an accelerator operation amount change rate ΔAcc representing the rate of change in the accelerator operation amount Acc for a predetermined time period (e.g., several minutes to several tens of minutes) in the past and a brake operation amount change rate ΔBP representing the rate of change of the brake-pedal position BP for the predetermined time period in the past are obtained (step S120). Then, an accelerator-brake operation amount change rate ratio Ptab, which is the ratio between the accelerator operation amount change rate ΔAcc and the brake operation amount change rate ΔBP is obtained by dividing the accelerator operation amount change rate ΔAcc by the brake operation amount change rate ΔBP (S130). Then, the SOC monitoring reference level SOC* of the battery 50 is set using a map defining the relation between the accelerator-brake operation amount change rate ratio Ptab and the SOC monitoring reference level SOC* (step S140). More specifically, in this example embodiment of the invention, the accelerator operation amount change rate ΔAcc is set to an average of the amount of change in the accelerator operation amount obtained under the condition that the accelerator operation amount Acc is larger than its previous value (previous Acc), that is, the amount that the accelerator operation amount Acc changed as the accelerator pedal 83 was depressed during the predetermined time period in the past (Acc—previous Acc). Likewise, the brake operation amount change rate ΔBP is set to an average of the amount of change in the brake operation amount obtained in a state where the brake operation amount BP is larger than its previous value (previous BP), that is, the amount that the brake operation amount BP changed as the brake pedal 85 was depressed during the predetermined time period in the past (BP—previous BP). FIG. 4 shows an example of a map defining the relation between the accelerator-brake operation amount change rate ratio Ptab and the SOC monitoring reference level SOC*. Referring to FIG. 4, an upper limit value Shi and a lower limit value Slow of the SOC monitoring range of the battery 50 are set based on the characteristics of the battery 50, and the like. The upper limit value Shi is set to, for example, 80%, 85%, or 90%, and the lower limit value Slow is set to, for example, 35%, 40%, or 45%. In the example of FIG. 4, the SOC monitoring reference level SOC* is set such that it becomes higher the higher the accelerator-brake operation amount change rate ratio Ptab. The accelerator-brake operation amount change rate ratio Ptab becomes higher the higher the accelerator operation amount change rate ΔAcc, that is, the more the driver depresses the accelerator pedal 83 to accelerate the hybrid vehicle 20, and the lower the brake operation amount change rate ΔBP, that is, the more gently the driver depresses the brake pedal 85 to decelerate the hybrid vehicle 20. In the example illustrated in FIG. 4, the SOC monitoring reference level SOC* of the battery 50 is made higher the more rapidly the driver attempts to accelerate the hybrid vehicle 20 and the more gently the driver decelerates the hybrid vehicle 20. The reason of this setting of the SOC monitoring reference level SOC* will be described in detail later.

Figure 5:
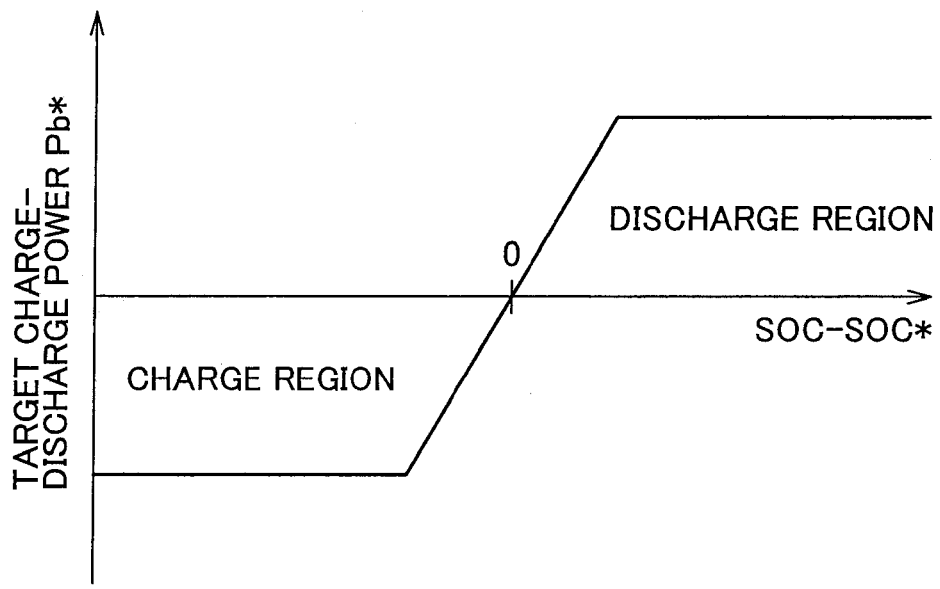
FIG. 5 is a chart illustrating an example of a target charge-discharge power setting map.

After the SOC monitoring reference level SOC* of the battery 50 has been set in the procedure described above, the CPU 72 then sets a target charge-discharge power Pb* using the SOC monitoring reference level SOC*, which has been set as above, and the SOC level of the battery 50 (step S150), and then the CPU 72 calculates a target power Pe* for the hybrid vehicle 20 by multiplying the target torque Tr* by a rotation speed Nr of the ring gear shaft 32*a* and then subtracting the target charge-discharge power Pb* of the battery 50 from the product and then adding a loss Loss to the difference (step S160). More specifically, in this example embodiment of the invention, the target charge-discharge power Pb* is set as follows. First, the relation between the value obtained by subtracting the SOC monitoring reference level SOC* from the SOC level of the battery 50 (SOC−SOC*) and the target charge-discharge power Pb* is determined in advance and stored in the form of a map in the ROM 74, which map will be referred to as "target charge-discharge power setting map". The target charge-discharge power Pb* is set by applying (SOC−SOC*) to the target charge-discharge power setting map. FIG. 5 illustrates an example of the target charge-discharge power setting map. Referring to FIG. 5, the target charge-discharge power Pb* is set to a positive value (a value for battery discharge) when (SOC−SOC*) is positive, that is, when the SOC level of the battery 50 is higher than the SOC monitoring reference level SOC*, and the target charge-discharge power Pb* is set to a negative value (a value for battery charge) when (SOC−SOC*) is negative, that is, when the SOC level of the battery 50 is lower than the SOC monitoring reference level SOC*. The rotation speed Nr of the ring gear shaft 32*a* can be obtained by multiplying the vehicle speed V by a conversion factor (Nr=k·V) or by dividing the rotation speed Nm2 of the electric motor MG2 by the gear ratio of the reduction gear unit 35 (Nr=Nm2/Gr).

Then, the CPU 72 compares the target power Pe* with a threshold Pref (step S170). At this time, if the target power Pe* is smaller than the threshold Pref, the CPU 72 then compares the SOC level of the battery 50 with a threshold Sref (step S180). The threshold Pref is set to, for example, a value close to the lower limit of a power range where the operation efficiency of the engine 22 is relatively high. The threshold Sref is set to, for example, a value larger than the SOC level corresponding to the amount of power required to start the engine 22. In this example embodiment, the threshold Sref is set to a value larger than the lower limit value Slow in order to monitor the SOC level of the battery 50 within the SOC monitoring range. Thus, whether to execute the engine drive mode or the motor drive mode, which have been described in detail above, is determined through step S170 and step S180. More specifically, in this example embodiment of the invention, the engine drive mode is selected when the target power Pe* is equal to or larger then the threshold Pref or when the target power Pe* is smaller than the threshold Pref but the SOC level of the battery 50 is lower than the threshold Sref, and the motor drive mode is selected when the target power Pe* is smaller than the threshold Pref and the SOC level of the battery 50 is equal to or higher than the threshold Sref.

Thus, when the target power Pe* is equal to or larger then the threshold Pref or when the target power Pe* is smaller than the threshold Pref but the SOC level of the battery 50 is lower than the threshold Sref, the engine drive mode is selected, and a target engine speed Ne* and a target torque Te* that together define the target operation point of the engine 22 are set based on the target power Pe* (step S190).

Figure 6:
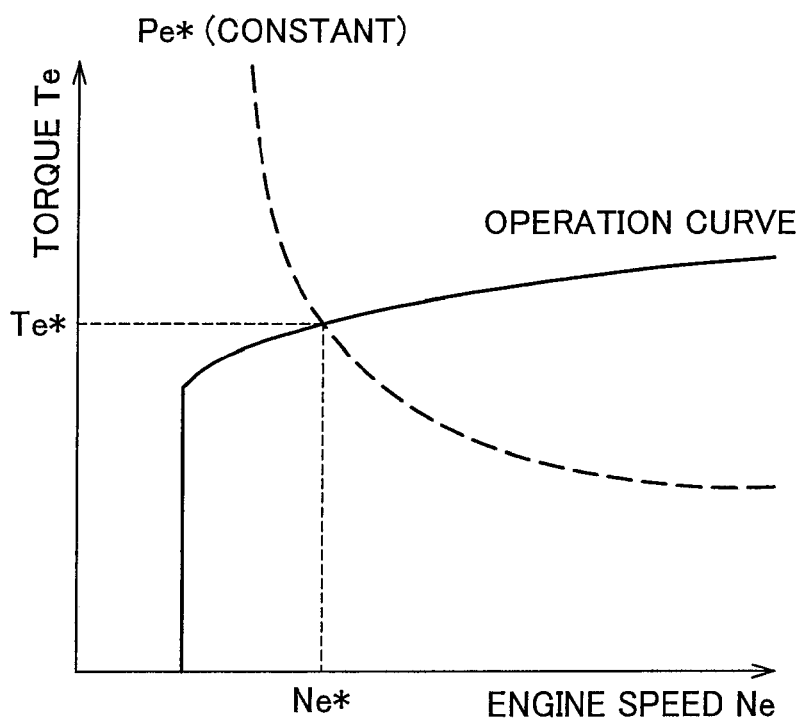
FIG. 6 is a chart illustrating an example of an operation curve for the engine and how to set the target engine speed and the target torque.

This setting is performed based on an operation curve set for efficient operation of the engine 22 and the target power Pe*. FIG. 6 illustrates an example of such an operation curve for the engine 22 and how the target engine speed Ne* and the target torque Te* are set. Referring to FIG. 6, the target engine speed Ne* and the target torque Te* can be set based on the intersecting point between the operation curve and a constant curve of the target power Pe*(Pe*(Ne*×Te*).

Figure 7:
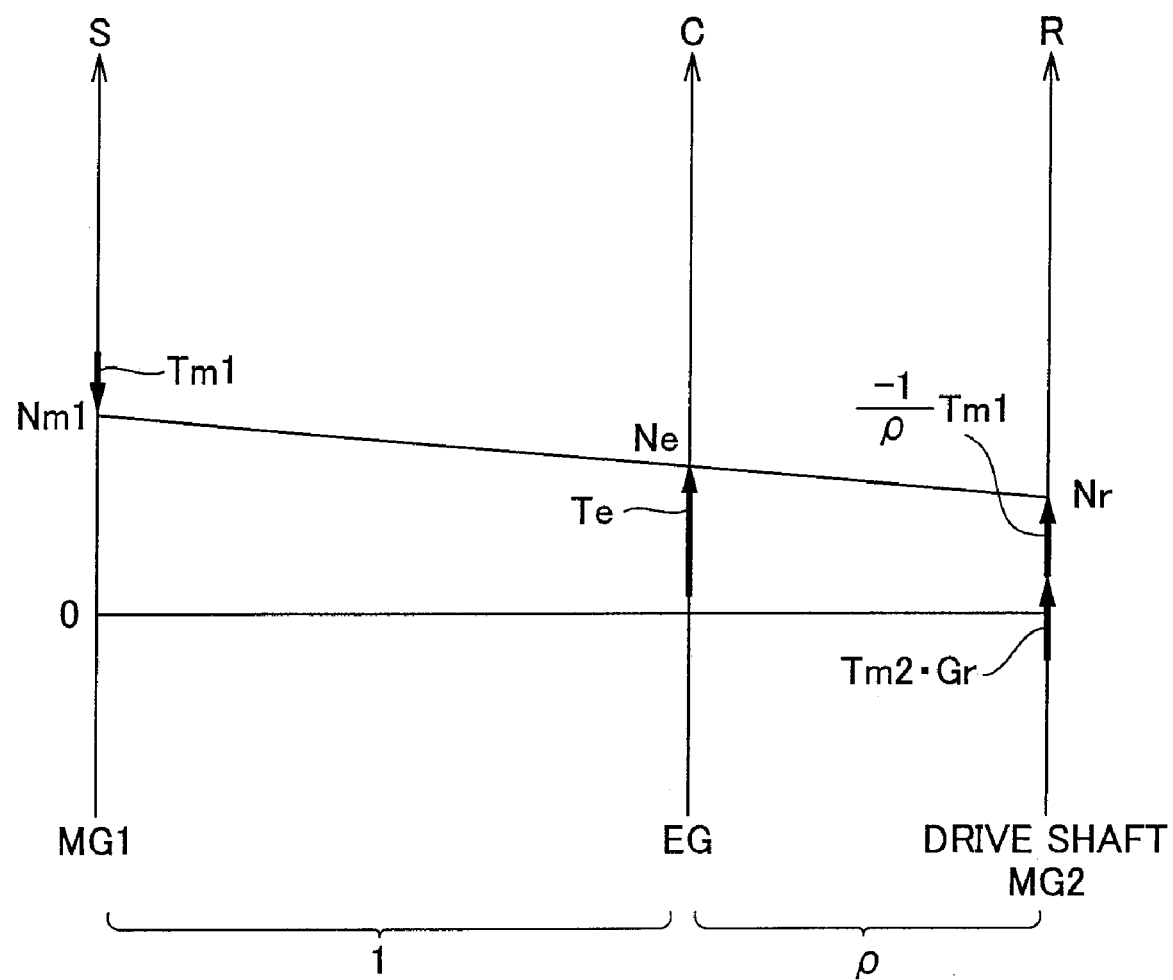
FIG. 7 is a chart illustrating an example of an alignment chart indicating the physical relation between the rotation speed and the torque of each rotational element of a drive force distribution-combination mechanism when the hybrid vehicle is running while outputting drive force from the engine.

Next, using the expression (1) indicated below, the rotation speed Nm1 of the electric motor MG1 will be calculated from the target engine speed Ne*, the rotation speed Nm2 of the electric motor MG2, a gear ratio ρ of the drive force distribution-combination mechanism 30, and a gear ratio Gr of the reduction gear unit 35. Then, using the expression (2) indicated below, a command torque Tm1*, which is the torque required to be output from the electric motor MG1, is calculated from the target rotation speed Nm1* calculated as described above, the rotation speed Nm1 of the electric motor MG1 obtained, the target torque Te* of the engine 22, and the gear ratio ρ of the drive force distribution-combination mechanism 30 (step S200). The expression (1) defines a physical relation between the rotational elements of the drive force distribution-combination mechanism 30. FIG. 7 shows an example of an alignment chart illustrating the physical relation between the rotation speed and the torque of each rotational element of the drive force distribution-combination mechanism 30 when the hybrid vehicle 20 is running while outputting drive force from the engine 22. In FIG. 7, the axis S on the left represents the rotation speed of the sun gear 31 indicating the rotation speed Nm1 of the electric motor MG1, the axis C represents the rotation speed of the carrier 34 indicating the speed Ne of the engine 22, and the axis R represents the rotation speed Nr of the ring gear 32 that is obtained by dividing the rotation speed Nm2 of the electric motor MG2 by the gear ratio Gr of the reduction gear unit 35. The expression (1) can be easily formulated from this alignment chart. The two bold arrows on the axis R represent the torque allocated to the ring gear shaft 32*a* from the torque Tm1 output from the electric motor MG1 and the torque allocated, via the reduction gear unit 35, to the ring gear shaft 32*a* from the torque Tm2 output from the electric motor MG2. The expression (2) represents a relation used in the feedback control for driving the electric motor MG1 to rotate at the target rotation speed Nm1*. In the expression (2), "k1" at the second term of the right side is a proportional gain and "k2" at the third term on the right side is an integral gain.

$$Nm1^* = Ne^* \cdot (1+\rho)/\rho - Nm2/(Gr \cdot \rho) \tag{1}$$

$$Tm1^* = -\rho \cdot Te^*/(1+\rho) + k1(Nm1^*-Nm1) + k2\int(Nm1^*-Nm1)dt \tag{2}$$

Then, using the expression (3) indicated below, a temporary torque Tm2tmp, which is a temporary value of the torque required to be output from the electric motor MG2, is calculated by dividing the set command torque Tm1* by the gear ratio ρ of the drive force distribution-combination mechanism 30 and then adding the quotient to the target torque Tr* (step S210). Then, using the expression (4) indicated below, a lower limit torque Tm2min representing the lower limit of the range of toque allowed to be output from the electric motor MG2 is calculated by obtaining the power consumption (generated power) of the electric motor MG1 by multiplying the set command torque Tm1* with the present rotation speed Nm1 of the electric motor MG1 and then dividing the difference between the battery-input limit value Win and the obtained power consumption of the electric motor MG2 by the rotation speed Nm2 of the electric motor MG2. Likewise, using the expression (5) indicated below, an upper limit torque Tm2max representing the upper limit of the range of toque allowed to be output from the electric motor MG2 is calculated by obtaining the power consumption (generated power) of the electric motor MG1 by multiplying the set command torque Tm1* with the present rotation speed Nm1 of the electric motor MG1 and then dividing the difference between the battery-output limit value Wout and the obtained power consumption of the electric motor MG1 by the rotation speed Nm2 of the electric motor MG2. Note that the expression (3) can be easily formulated from the alignment chart of FIG. 7.

$$Tm2tmp=(Tr^*+Tm1^*/\rho)/Gr \qquad (3)$$

$$Tm2\min=(Win-Tm1^* \cdot Nm1)/Nm2 \qquad (4)$$

$$Tm2\max=(Wout-Tm1^* \cdot Nm1)/Nm2 \qquad (5)$$

$$Tm2^*=\max(\min(Tm2tmp,Tm2\max),Tm2\min) \qquad (6)$$

Figure 8:
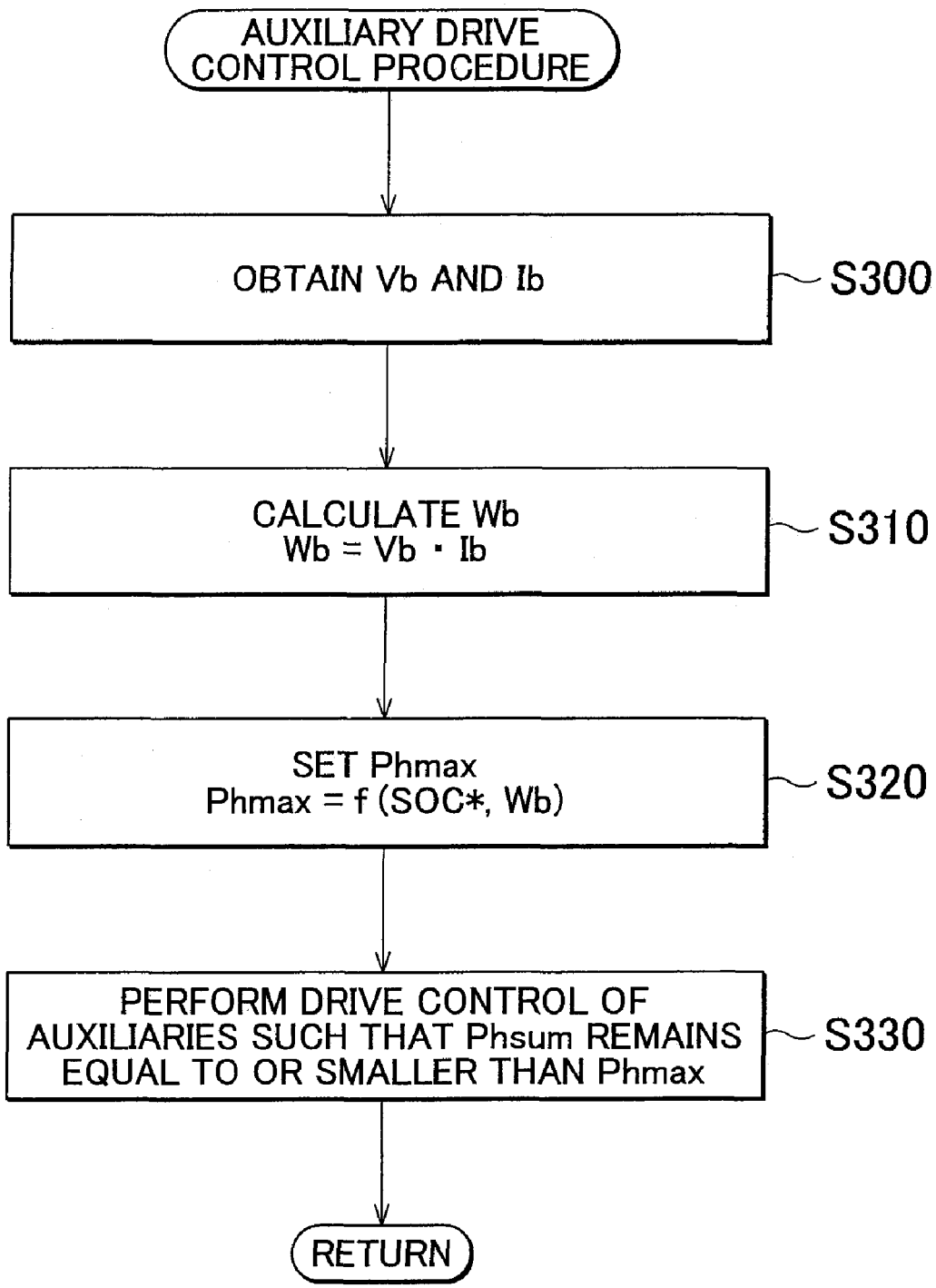
FIG. 8 is a flowchart illustrating an example of an auxiliary drive control procedure.

After setting the target engine speed Ne* and the target torque Te* of the engine 22, the command torque Tm1* of the electric motor MG1, and the command torque Tm2* of the electric motor MG2 as described above, the CPU 72 transmits the target engine speed Ne* and the target torque Te* of the engine 22 to the engine ECU 24 and transmits the command torque Tm1* of the electric motor MG1 and the command torque Tm2* of the electric motor MG2 to the motor ECU 40 (step S240). Then, the shift position sensor 82 executes an auxiliary drive control procedure illustrated in FIG. 8 to drive the respective auxiliaries (the high-voltage auxiliaries 92 including the air compressor and the cooling pump and the DC-DC converter 94 in this example embodiment) (step S250), after which the CPU 72 finishes the drive control routine. At this time, receiving the target engine speed Ne* and the target torque Te* from the CPU 72, the engine ECU 24 executes the intake amount control, the fuel injection control, the ignition control, etc., to the engine 22 so as to operate the engine 22 at the target operation point defined by the target engine speed Ne* and the target torque Te*. On the other hand, receiving the command torque Tm1* and the command torque Tm2* from the CPU 72, the motor ECU 40 executes the switching control for the inverters 41, 42 such that the electric motor MG1 produces the command torque Tm1* and the electric motor MG2 produces the command torque Tm2*. Thus, in the engine drive mode, through the above-described controls, the SOC level of the battery 50 is monitored based on the SOC monitoring reference level SOC*, and the engine 22 is efficiently operated in the range between the battery-input limit value Win and the battery-output limit value Wout to output the target torque Tr* to propel the hybrid vehicle 20. The auxiliary drive control procedure in FIG. 8 will be described in detail later.

Conversely, if the target power Pe* is smaller than the threshold Pref in step S170 and the SOC level of the battery 50 is equal to or higher then the threshold Sref, the motor drive mode is selected, and the target engine speed Ne* and the target torque Te* of the engine 22 are set to zero to stop the engine 22 (step S260), and the command torque Tm1* of the electric motor MG1 is set to zero (step S270), and step S210 and its subsequent steps are executed. Thus, in the motor drive mode, the electric motor MG2 is driven by powering within the range up to the battery-input limit value Win and within the range up to the battery-output limit value so as to output the target torque Tr* to the ring gear shaft 32a to propel the hybrid vehicle 20.

As such, through the controls described above, because the hybrid vehicle 20 runs in the engine drive mode or in the motor drive mode using the SOC monitoring reference level SOC* set based on the record of the accelerator operation amount Acc and the record of the brake-pedal position BP, and therefore the SOC level of the battery 50 can be more properly monitored and controlled. When the hybrid vehicle 20 is accelerated in the engine drive mode, the drive force produced by the engine 22 is insufficient because the response of the engine 22 is slow as compared to the electric motors MG1, MG2, etc. At this time, to compensate for the insufficiency of drive force, the electric motor MG2 is driven on the power generated by the electric motor MG1 or the power discharged from the battery 50 and thus outputs drive force to the ring gear shaft 32a, which is the drive shaft. On the other hand, when the hybrid vehicle 20 is running in the motor drive mode, the electric motor MG2 is driven on the power discharged from the battery 50 to output the required drive force to the ring gear shaft 32a. In this example embodiment of the invention, in view of the above, when the accelerator-brake operation amount change rate ratio Ptab is relatively high (e.g., in a case where the driver tends to require rapid acceleration and/or require gentle deceleration), the SOC monitoring reference level SOC* is set to a relatively large value to allow a large amount of power to be discharged from the battery 50 in order to satisfy acceleration requests from the driver. When the hybrid vehicle 20 is running steadily in the engine drive mode, the relatively high SOC monitoring reference level SOC* is relatively high and the SOC level of the battery 50 is monitored in the vicinity of said SOC level. In this case, however, if the driver is requiring rapid acceleration of the hybrid vehicle 20 or requiring relatively small drive force, the likelihood for the motor drive mode to be continued is relatively high, and therefore power discharge of the battery 50 tends to be performed. On the other hand, when the accelerator-brake operation amount change rate ratio Ptab is relatively low (i.e., in a case where the driver tends to require gentle acceleration of the hybrid vehicle 20), the insufficiency of drive force for acceleration of the hybrid vehicle 20 is often small, and therefore the hybrid vehicle 20 can be accelerated as required without performing power discharge from the battery 50 or by using only relatively small power. In this case, therefore, in order to improve the energy efficiency, the SOC monitoring reference level SOC* is set to a relatively small value and therefore regenerative drive of the electric motor MG2 is performed during braking to charge a relatively large amount of power to the battery 50.

Next, the control procedure for controlling the driving of each auxiliary will be described. In the auxiliary drive control procedure shown in FIG. 8, first, the CPU 72 obtains the terminal voltage Vb and the charge-discharge current Ib of the battery 50 (step S300) and then calculates a charge-discharge power Wb, which represents the power charged to or discharged from the battery 50, by multiplying the obtained terminal voltage Vb by the charge-discharge current Ib (step S310). At this time, the CPU 72 refers to the terminal voltage Vb and the charge-discharge current Ib that have been detected by the voltage sensor 51a and the current sensor 51b and obtained from the battery ECU 52 by communication. The charge-discharge power Wb is set to a positive value when power is being discharged from the battery 50 and to a negative value when power is being charged to the battery 50.

Figure 9:
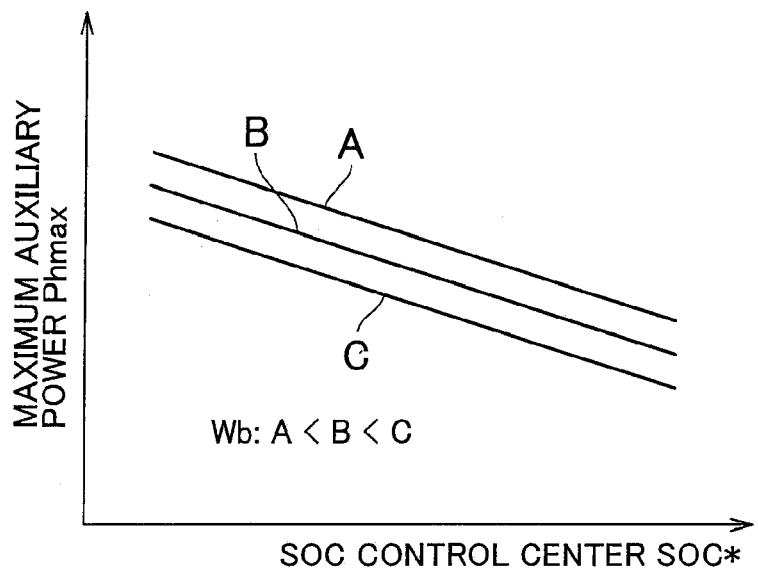
FIG. 9 is a chart illustrating an example of an maximum auxiliary power setting map.

Subsequently, the CPU 72 sets an maximum auxiliary power Phmax, which represents the upper limit of the total power allowed to be consumed by the respective auxiliaries (the high-voltage auxiliaries 92 including the air compressor and the cooling pump and the DC-DC converter 94 in this example embodiment), based on the SOC monitoring reference level SOC* and the charge-discharge power Wb (step S320). Then, the CPU 72 drives the respective auxiliaries within the range where a total power consumption Phsum representing the sum of the power consumed by the respective auxiliaries remains equal to or smaller than the maximum auxiliary power Phmax (step S330), after which the CPU 72 finishes the auxiliary drive control procedure. In this example embodiment of the invention, the maximum auxiliary power Phmax is set as follows. First, the relation among the SOC monitoring reference level SOC*, the charge-discharge power Wb, and the maximum auxiliary power Phmax is determined in advance and stored in the form of a map in the ROM 74, which map will hereinafter be referred to as "maximum auxiliary power setting map". The maximum auxiliary power Phmax is set by applying the SOC monitoring reference level SOC* and the charge-discharge power Wb to this maximum auxiliary power setting map. FIG. 9 illustrates an example of the maximum auxiliary power setting map. Referring to FIG. 9, the maximum auxiliary power Phmax is set smaller the higher the SOC monitoring reference level SOC*. As mentioned earlier, in this example embodiment of the invention, the SOC monitoring reference level SOC* is set to a relatively large value in order to satisfy acceleration requests of the driver in a state where the driver tends to request rapid acceleration of the hybrid vehicle 20. Therefore, when the SOC monitoring reference level SOC* is relatively high, the load on the electric motor MG2 tends to be relatively large and therefore power discharge from the battery 50 tends to be performed. In view of this, in the example illustrated in FIG. 9, the maximum auxiliary power Phmax is set smaller the higher the SOC monitoring reference level SOC*. As such, in a case where the SOC monitoring reference level SOC* is relatively high and therefore power discharge from the battery 50 tends to be performed, the total auxiliary power consumption Phsum representing the total power consumption by the respective auxiliaries can be made small, and therefore power of an amount needed to drive the electric motor MG2 to output a relatively large drive force to the ring gear shaft 32a can be more reliably secured. Further, as shown in FIG. 9, the maximum auxiliary power Phmax is set smaller the larger the charge-discharge power Wb. An example case where the charge-discharge power Wb is large is when the hybrid vehicle 20 is being accelerated by driving the motor MG on the power discharged from the battery 50 to output a relatively large drive force to the ring gear 32, which is the drive shaft. In such a case, in this embodiment of the invention, therefore, the maximum auxiliary power Phmax is set smaller the larger the charge-discharge power Wb in order to make the total auxiliary power consumption Phsum of the respective auxiliaries small. As such, in a case where a relatively large power is discharged from the battery 50, such as when the hybrid vehicle 20 is rapidly accelerated, power of an amount needed to drive the electric motor MG2 to output a relatively large drive force to the ring gear shaft 32a can be more reliably secured. As a result, power needed for rapid acceleration of the hybrid vehicle 20 can be more reliably secured, and the target torque Tr* can be more reliably output to the ring gear shaft 32a as the drive shaft in accordance with the SOC monitoring reference level SOC* and the charge-discharge power Wb.

According to the hybrid vehicle 20 of the above-described example embodiment of the invention, the engine 22, the electric motor MG1, and the electric motor MG2 are controlled by setting the SOC monitoring reference level SOC* higher the more likely the driver is to require rapid acceleration and monitoring the SOC level of the battery 50 based on the SOC monitoring reference level SOC* thus set, and therefore the SOC level of the battery 50 can be more properly monitored and controlled. Further, the maximum auxiliary power Phmax, which is the upper limit of the total power allowed to be consumed by the respective auxiliaries, is set smaller the higher the SOC monitoring reference level SOC* and the larger the charge-discharge power Wb, and the respective auxiliaries are driven such that the total auxiliary power consumption Phsum, which is the sum of the power consumption of the respective auxiliaries, remains equal to or smaller than the maximum auxiliary power Phmax. Therefore, power required to drive the electric motor MG2 can be more properly secured. That is, in a state where the driver tends to require rapid acceleration of the hybrid vehicle 20 or in a state where the hybrid vehicle 20 is being rapidly accelerated, the power required for rapid acceleration can be reliably secured. That is, the hybrid vehicle 20 can be propelled by producing the target torque Tr* at the ring gear shaft 32a as the drive shaft by powering within the range up to the battery-input limit value Win of the battery 50 and within the range up to the battery-output limit value of the battery 50.

While the maximum auxiliary power Phmax is set using the SOC monitoring reference level SOC* of the battery 50 and the charge-discharge power Wb in the hybrid vehicle 20 of the above-described example embodiment of the invention, as long as the maximum auxiliary power Phmax is set using the SOC monitoring reference level SOC*, other parameter, such as the battery temperature Tb of the battery 50, may be used in place of the charge-discharge power Wb. Further, the maximum auxiliary power Phmax may be set using the SOC monitoring reference level SOC* only, that is, without considering the charge-discharge power Wb.

Further, while the respective auxiliaries are driven such that the total auxiliary power consumption Phsum becomes equal to or smaller than the maximum auxiliary power Phmax in the hybrid vehicle 20 of the above-described example embodiment, the hybrid vehicle may be such that one of the auxiliaries is driven such that its power consumption Ph becomes equal to or smaller than the maximum auxiliary power Phmax. In this case, the maximum auxiliary power Phmax may be set based on the rating of the auxiliary.

Further, while the auxiliaries are the high-voltage auxiliaries 92 including the air compressor and the cooling pump and the DC-DC converter 94 in the hybrid vehicle 20 of the foregoing example embodiment of the invention, the auxiliaries may alternatively be, for example, low-voltage auxiliaries connected to the low-voltage battery 96.

While the SOC monitoring reference level SOC* of the battery 50 is set based on the accelerator operation amount change rate ΔAcc and the brake operation amount change rate ΔBP in the hybrid vehicle 20 of the foregoing example embodiment of the invention, any modifications can be made as long as the SOC monitoring reference level SOC* is set based on the record of the accelerator operation amount Acc and the record of the brake-pedal position BP. For example, the SOC monitoring reference level SOC* may be set using, in place of the accelerator operation amount change rate ΔAcc and the brake operation amount change rate ΔBP, an accelerator-on duration Ta in a given time period in the past and a brake-on duration in the same time period. Further, the SOC monitoring reference level SOC* may be set using, in place of the accelerator operation amount change rate ΔAcc and the brake operation amount change rate ΔBP, an accumulative value of the accelerator operation amount Acc accumulated for an accelerator-on duration in a given time period in the past and an accumulative value of the brake operation amount change rate ΔBP accumulated for a brake-on duration in the same time period in the past. Further, not only values obtained in a specific time period in the past, for example, the SOC monitoring reference level SOC* may be set using the values of the accelerator operation amount Acc and the values of the brake-pedal position BP obtained before the ignition was turned off the last time, for example.

Further, while the SOC monitoring reference level SOC* of the battery 50 is set based on the record of the accelerator operation amount Acc and the record of the brake-pedal position BP both indicating the amounts of operation by the driver in the hybrid vehicle 20 of the foregoing example embodiment of the invention, the SOC monitoring reference level SOC* may be set based on the vehicle speed V, which is a parameter indicating the state of the hybrid vehicle 20, and an weight M of the hybrid vehicle 20 instead of or in addition to the above parameters. In this case, further, the SOC monitoring reference level SOC* of the battery 50 may be set lower the higher the vehicle speed V and the smaller the vehicle weight M. This is because the amount of power generated through the regenerative driving of the electric motor MG2 is larger the higher the vehicle speed V and the larger the vehicle weight M. Note that the vehicle weight M is calculated by, for example, dividing drive force F for propelling the hybrid vehicle 20 by acceleration a of the vehicle, and the drive force F for propelling the hybrid vehicle 20 is calculated, for example, by multiplying the target torque Tr* by a conversion factor. The acceleration α is detected by, for example, an acceleration sensor, not shown in the drawings. Further, the rotation speed Nr of the ring gear shaft 32a as the drive shaft may be used instead of the vehicle speed V.

Further, while the electric motor MG2 is connected to the ring gear shaft 32a as the drive shaft via the reduction gear unit 35 in the hybrid vehicle 20 of the foregoing example embodiment of the invention, the electric motor MG2 may be directly connected to the ring gear shaft 32a, or the electric motor MG2 may be connected to the ring gear shaft 32a via an automatic transmission having two speeds, three speeds, four speeds, and so on, instead of the reduction gear unit 35.

Figure 10:
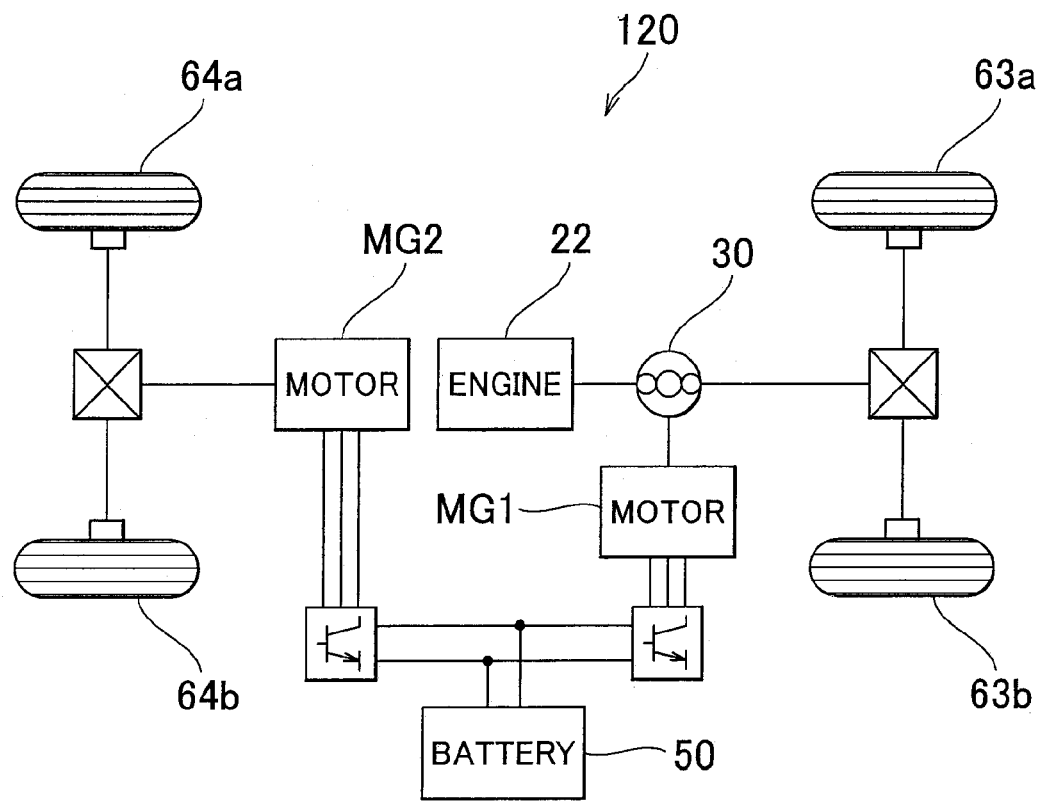
FIG. 10 is a view schematically showing the configuration of a hybrid vehicle according to a modification example.

While the drive force of the electric motor MG2 is output to the ring gear shaft 32a while changing the rotation speed at the reduction gear unit 35 in the hybrid vehicle 20 of the foregoing example embodiment of the invention, it may be modified as in a hybrid vehicle 120 according to a modification example illustrated in FIG. 10. In this modification example, referring to FIG. 10, the drive force of the electric motor MG2 is output to an axle (the axle connected to drive wheels 64a, 64b in FIG. 10) that is different from an axle connected to the ring gear shaft 32a (the axle connected to drive wheels 63a, 63b).

Figure 11:
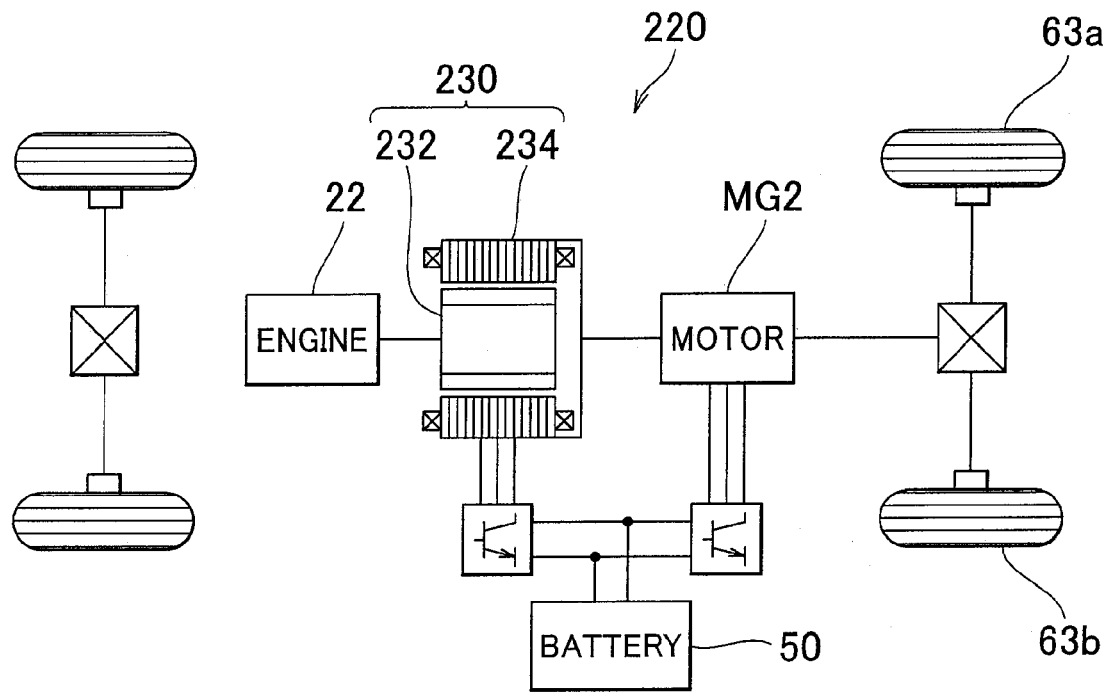
FIG. 11 is a view schematically showing the configuration of a hybrid vehicle according to another modification example.

Further, while the drive force of the engine 22 is output to the ring gear shaft 32a as the drive shaft connected to the drive wheels 63a, 63b via the drive force distribution-combination mechanism 30 in the hybrid vehicle 20 of the foregoing example embodiment of the invention, it may be modified as in a hybrid vehicle 220 according to a modification example illustrated in FIG. 11. Referring to FIG. 11, the hybrid vehicle 220 has a twin-rotor motor 230 having an inner rotor 232 connected to the crankshaft 26 of the engine 22 and an outer rotor 234 connected to a drive shaft via which drive force is output to the drive wheels 63a, 63b and operable to transmit part of the drive force from the engine 22 to the drive shaft while converting the rest of the drive force into electric power.

Figure 12:
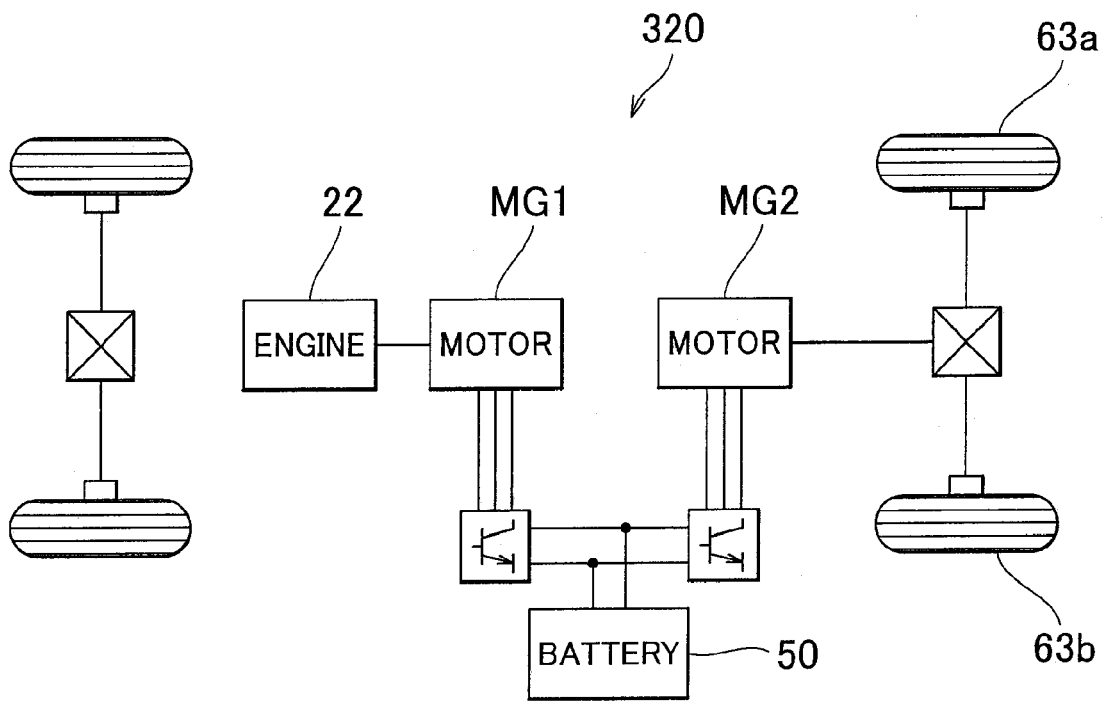
FIG. 12 is a view schematically showing the configuration of a hybrid vehicle according to another modification example.

Further, while the drive force of the engine 22 is output to the ring gear shaft 32a as the drive shaft connected to the drive wheels 63a, 63b via the drive force distribution-combination mechanism 30 in the hybrid vehicle 20 of the foregoing example embodiment of the invention, it may be modified as in a hybrid vehicle 320 according to a modification example illustrated in FIG. 12. Referring to FIG. 12, the electric motor MG2 is connected to the engine 22 and used as a generator, and the electric motor MG2 is used to propel the hybrid vehicle 320.

Figure 13:
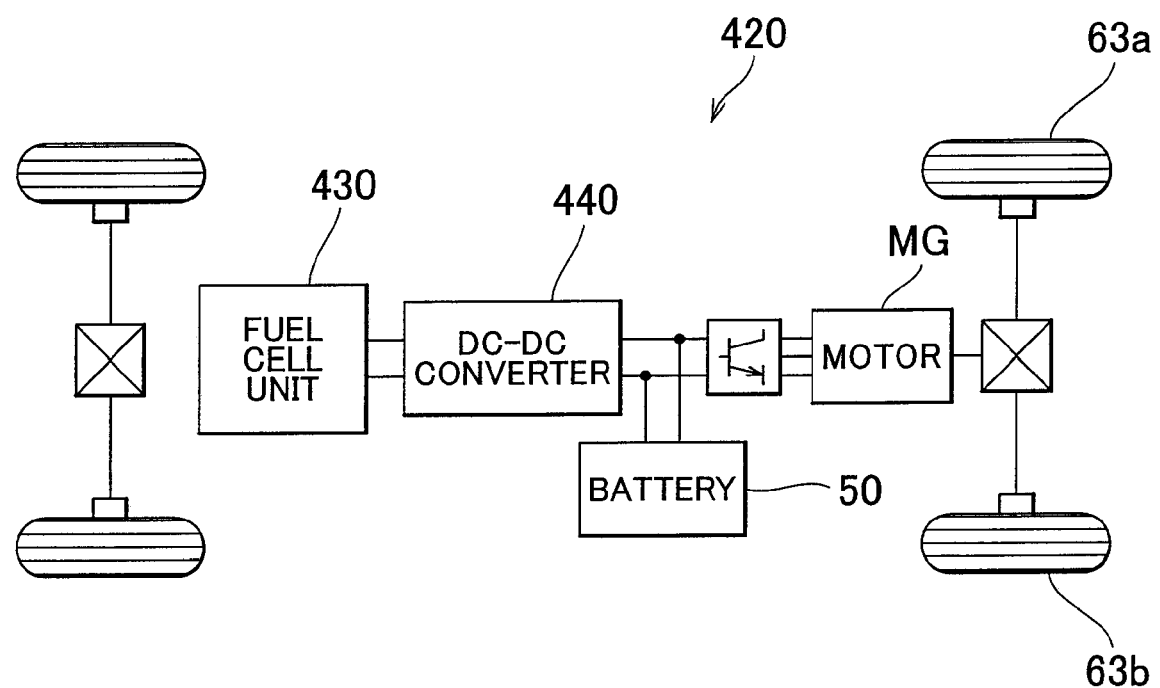
FIG. 13 is a view schematically showing the configuration of a hybrid vehicle according to another modification example.

Further, application of the invention is not limited to hybrid vehicles. For example, the invention may be applied to fuel cell vehicles such as a fuel cell vehicle 420 according to a modification example illustrated in FIG. 13. In the fuel cell vehicle 420, the voltage of power generated by a fuel cell unit 430 is raised by a DC-DC converter 440 and then supplied to the battery 50 and to a motor MG.

Further, application of the invention is not limited to hybrid vehicles and fuel cell vehicles. For example, the invention may be applied also to drive force output apparatuses mounted on various mobile units including vehicles other than motor vehicles, vessels, air planes, and so on, or to drive force output apparatuses incorporated in non-movable equipments such as construction equipments. Further, the invention may be embodied as methods for controlling such drive force output apparatuses.

In the forgoing example embodiment of the invention, the engine 22, the electric motor MG1, and the drive force distribution-combination mechanism 30 may be regarded as "power generator" cited in the claims, and the electric motor MG2 may be regarded as "electric motor" cited in the claims, the battery 50 may be regarded as "power storage" cited in the invention, the auxiliaries 92 and the DC-DC converter 94 may be regarded as "auxiliary" cited in the invention, the hybrid ECU 70 that executes step S110 of the drive control routine in FIG. 2 in which the target torque Tr* is set based on the accelerator operation amount Acc and the brake-pedal position BP may be regarded as "target drive force setting portion" cited in the claims, the hybrid ECU 70 that executes step 120 to step S240 of the drive control routine in FIG. 2 in which the SOC monitoring reference level SOC* of the battery 50 is set based on the record of the accelerator operation amount Acc and the record of the brake-pedal position BP both indicating the amounts of operation by the driver, the SOC level of the battery 50 is monitored based on the SOC monitoring reference level SOC*, the target engine speed Ne* and the target torque Te* of the engine 22, the command torque Tm1* of the electric motor MG1, and the command torque Tm2* of the electric motor MG2 are set such that the target torque Tr* is output to the ring gear shaft 32a as the drive shaft through powering within the range up to the battery-input limit value Win and within the range up to the battery-output limit value of the battery 50 and then the set parameters are transmitted to the engine ECU 24 and to the motor ECU 40 and that executes step S250 (AUXILIARY DRIVE CONTROL PROCEDURE in FIG. 8) of the drive control routine shown in FIG. 2 in which the maximum auxiliary power Phmax representing the upper limit of the total power allowed to be consumed by the respective auxiliaries including the auxiliaries 92 and the DC-DC converter 94 is set based on the SOC monitoring reference level SOC* and the charge-discharge power Wb and the respective auxiliaries are driven in a range where the total auxiliary power consumption Phsum indicating the sum of the power consumption of the respective auxiliaries is equal to or less than the maximum auxiliary power Phmax and the engine ECU 24 that controls the engine 22 based on the target engine speed Ne* and the target torque Te*, and the motor ECU 40 that controls the electric motor MG1 and the electric motor MG2 based on the command torque Tm1* and the command torque Tm2* obtained may be regarded as "controller" cited in the invention. The engine 22 may be regarded as "internal combustion engine" cited in the claims. The electric motor MG1 and the twin-rotor motor 230 may be regarded as "power generator". The drive force distribution-combination mechanism 30 may be regarded as "three-shaft drive force input-output portion" cited in the invention. The fuel cell unit 430 may be regarded as "power generation unit" cited in the invention.

The "power generator" cited in the claims is not limited to the combination of the engine 22, the electric motor MG1, and the drive force distribution-combination mechanism 30, to the combination of the engine 22 and the electric motor MG1, nor to the fuel cell unit 430, but it may be any power generator that generates power from fuel supplied. The "electric motor" cited in the claims is not limited to the electric motor MG2 that is a synchronous motor-generator, but it may be any electric motor that can output drive force to the drive shaft, such as an induction motor. The "power storage" cited in the claims is not limited to the battery 50 that is a lithium-ion battery, but it may be any power storage that supplies power to and is supplied with power from the power generator and the motor, such as nickel-hydrogen batteries and lead batteries. The "target drive force setting portion" cited in the invention is not limited to a setting portion that sets the target torque Tr* based on the accelerator operation amount Acc, the brake-pedal position BP, and the vehicle speed V, but it may be any setting portion that sets the target drive force required to be output to the drive wheels, such as the one that sets the target torque based on the accelerator operation amount Acc and the brake-pedal position BP without considering the vehicle speed V. The "controller" cited in the invention is not limited to the combination of the hybrid ECU 70, the engine ECU 24 and the motor ECU 40, but it may be a single electronic control unit, for example. Further, the "controller" cited in the claims is not limited to a controller that sets the SOC monitoring reference level SOC* of the battery 50 based on the record of the accelerator operation amount Acc and the record of the brake-pedal position BP both indicating the amounts of operation by the driver, monitors the SOC level of the battery 50 based on the SOC monitoring reference level SOC*, sets the target engine speed Ne* and the target torque Te* for the engine 22 and the command torque Tm1* for the electric motor MG1, the command torque Tm2* for the electric motor MG2 such that the target torque Tr* is output to the ring gear shaft 32a as the drive shaft through powering within the range up to the battery-input limit value Win and within the range up to the battery-output limit value of the battery 50, sets the maximum auxiliary power Phmax, representing the upper limit of the total power allowed to be consumed by the respective auxiliaries including the auxiliaries 92 and the DC-DC converter 94, based on the SOC monitoring reference level SOC* of the battery 50 and the charge-discharge power Wb of the battery 50, and drives the respective auxiliaries such that the total auxiliary power consumption Phsum, representing the sum of the power consumption by the respective auxiliaries, remains equal to or smaller than the maximum auxiliary power Phmax. That is, the "controller" cited in the claims is not limited may be any controller that sets a SOC monitoring reference level of a monitoring SOC range for monitoring the SOC level of the power storage based on the state of operation by the driver and/or based on the state of the drive force output apparatus and sets the upper limit of power for driving the respective auxiliaries and monitors the SOC level of the power storage based on the SOC monitoring reference level and controls the power generator, the motor, and the auxiliaries such that the target drive force is output to the drive shaft while the power consumed by the respective auxiliaries remains equal to or smaller than the set upper limit of power for driving the respective auxiliaries, such as the one that sets the SOC monitoring reference level SOC* based on the vehicle speed V and the vehicle weight M indicating the state of the vehicle instead of or in addition to the operations by the driver or the one that sets the maximum auxiliary power Phmax based on the SOC monitoring reference level SOC*. The "internal combustion engine" cited in the claims is not limited to internal combustion engines that run on hydrocarbon fuels such as gasoline and light oil, but it may be any internal combustion engine including those running on hydrogen as fuel. The "power generator" cited in the claims is not limited to the electric motor MG1 that is a synchronous motor-generator nor to the twin-rotor motor 230, it may be any power generator that generates power using at least part of the drive force from the internal combustion motor (e.g., induction motor). The "three-shaft drive force input-output portion" cited in the claims is not limited to the drive force distribution-combination mechanism 30, but it may be any mechanism that is connected to the drive shaft, to the output shaft of the internal combustion engine, and to the rotational shaft of the power generator through three shafts and, based on the drive force input to or output from one of the three shafts, controls drive force input and output of the other two shafts, such as the one that incorporates a double-pinion type planetary gearset, the one that incorporates two or more planetary gearsets and having four or more shafts for drive connections, and the one that has a differential function (e.g., differential gear unit).

While the invention has been described with reference to example embodiments thereof, it should be understood that the invention is not limited to the example embodiments or constructions. To the contrary, the invention is intended to cover various modifications and equivalent arrangements within the spirit and scope of the invention.

The invention can be utilized for manufacturing of drive force output apparatuses and vehicles, and the like.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

What is claimed is:

1. A drive force output apparatus for outputting drive force to a drive shaft, comprising:
   a power generation system that generates power using fuel supplied to the power generation system;
   an electric motor that outputs drive force to the drive shaft;
   a power storage device that exchanges power with the power generation system and with the electric motor;
   an auxiliary that operates on power supplied from a power supply system including the power storage device;
   a required drive force setting portion that sets a required drive force at the drive shaft; and
   a controller that sets a control center that is a center power storage amount in a range for controlling an amount of power stored in the power storage device based on a state of operation by an operator and/or a state of the drive force output apparatus; and the controller sets a maximum auxiliary power representing an upper limit of power allowed to be consumed by the auxiliary based on the set control center; and controls the power generation system, the electric motor, and the auxiliary such that the amount of power stored in the power storage device is controlled based on the set control center, and drive force corresponding to the set required drive force is output to the drive shaft while the power consumed by the auxiliary remains equal to or smaller than the maximum auxiliary power.

2. The drive force output apparatus according to claim 1, wherein
the controller sets the maximum auxiliary power based on the set control center and the power discharged from the power storage device.

3. The drive force output apparatus according to claim 2, wherein
the controller sets the maximum auxiliary power smaller the larger the power is that is discharged from the power storage device.

4. The drive force output apparatus according to claim 1, wherein
the auxiliary includes at least one of a DC-DC converter, an air-compressor for an air-conditioning system, and a cooling device for cooling the electric motor.

5. The drive force output apparatus according to claim 1, wherein
the auxiliary includes two or more auxiliaries and the maximum auxiliary power is the upper limit of total power allowed to be consumed by all the axillaries.

6. The drive force output apparatus according to claim 1, wherein
the power generation system has an internal combustion engine, a power generator that generates power using at least part of drive force of the internal combustion engine, and a power generator drive circuit that drives the power generation system.

7. The drive force output apparatus according to claim 6, wherein
the power generation system has a three-shaft drive force input-output portion that is connected to three shafts that are the drive shaft, to an output shaft of the internal combustion engine, and to a rotational shaft of the power generation system, and drive force is input to the three-shaft drive force input-output portion from one of the three shafts or the three-shaft drive force input-output portion outputs drive force to one of the three shafts, based on drive force input to and output from the other two shafts.

8. A vehicle incorporating the drive force output apparatus according to claim 1, wherein a vehicle axle is connected to the drive shaft.

9. The vehicle according to claim 8, wherein
the controller is a device for setting the control center larger as an amount by which an accelerator pedal was depressed to accelerate the vehicle in a previous operation by the operator becomes larger, and setting the maximum auxiliary power smaller as the set control center becomes larger.

10. A method for controlling a drive force output apparatus having: a power generation system that generates power using fuel supplied to the power generation system; an electric motor that outputs drive force to a drive shaft; a power storage device that exchanges power with the power generation system and with the electric motor; and an auxiliary that operates on power supplied from a power supply system including the power storage setting device, the method comprising:
a control center that is a center power storage amount in a range for controlling an amount of power stored in the power storage device is set based on a state of operation by an operator and/or a state of the drive force output apparatus; a maximum auxiliary power representing an upper limit of power allowed to be consumed by the auxiliary is set based on the set control center; and the power generation system, the electric motor, and the auxiliary are controlled such that the amount of power stored in the power storage device is controlled based on the set control center, and drive force corresponding to a required drive force that is required at the drive shaft is output to the drive shaft while the power consumed by the auxiliary remains equal to or smaller than the maximum auxiliary power.

* * * * *

UNITED STATES PATENT AND TRADEMARK OFFICE
CERTIFICATE OF CORRECTION

PATENT NO. : 7,766,788 B2
APPLICATION NO. : 12/263622
DATED : August 3, 2010
INVENTOR(S) : Sumikazu Shamoto It is certified that error appears in the above-identified patent and that said Letters Patent is hereby corrected as shown below:

| Column | Line | |
|---|---|---|
| 7 | 15 | Replace "chang-" with -- charg- --. |
| 8 | 7 | Change "toque-setting map" to --torque-setting map--. |
| 8 | 15 | Change "SOCK" to --SOC*--. |
| 9 | 13 | Before "Loss" delete "loss". |
| 9 | 61 | Change "larger then" to --larger than--. |
| 10 | 8 | Change "Pe*(Pe*(Ne*xTe*)" to --Pe*(Pe*(Ne*xTe*))--. |
| 10 | 60 | Change "toque" to --torque--. |
| 12 | 61 | After "sets" change "an" to --a--. |
| 15 | 22 | Change "acceleration a" to --acceleration α--. |
| 17 | 54 | After "limited" insert --and--. |
| 19 | 23 | Change "axillaries" to --auxiliaries--. |
| 20 | 23 | Before "a control center" insert --setting--. |

Signed and Sealed this

Sixteenth Day of November, 2010

David J. Kappos
*Director of the United States Patent and Trademark Office*